Aug. 26, 1924.

B. H. BAKER

SPRINGING OF VEHICLES

Filed Oct. 8, 1923

1,506,039

Inventor
Benjamin Harold Baker.
By Toulmin & Toulmin,
Attorneys.

Patented Aug. 26, 1924.

1,506,039

UNITED STATES PATENT OFFICE.

BENJAMIN HAROLD BAKER, OF BRISTOL, ENGLAND.

SPRINGING OF VEHICLES.

Application filed October 8, 1923. Serial No. 667,230.

*To all whom it may concern:*

Be it known that I, BENJAMIN HAROLD BAKER, residing at Poulton, Sneyd Park, Bristol, in the county of Gloucester, England, a subject of the King of Great Britain and Ireland, have invented certain new and useful Improvements in the Springing of Vehicles, of which the following is a specification.

This invention relates to road vehicle suspension of the type including an auxiliary spring which may be put into operation to a greater or lesser extent for the purpose of varying the suspension to suit different loadings of the vehicle.

Adjustable suspension for vehicles made in accordance with this invention is characterized by the features set forth in the following claims, and is exemplified by the following description, referring to the accompanying drawings, in which:—

Figure 1:
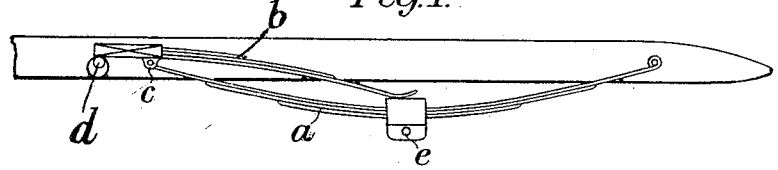
Figure 2:
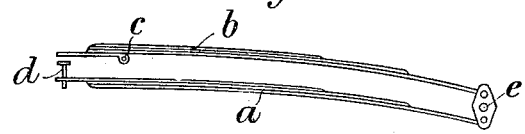
Figure 3:
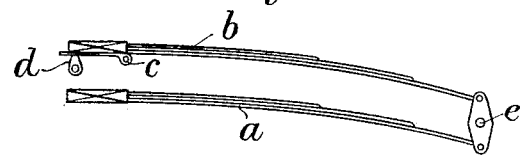

Fig. 1 illustrates diagrammatically one form of springing made in accordance with this invention, and Figs. 2 and 3 illustrate alternative forms.

In Fig. 1, the combination of a semi-elliptic main spring $a$ and a quarter-elliptic auxiliary spring $b$ is shown. In Figs. 2 and 3 a lower quarter-elliptic main spring $a$, and an upper quarter-elliptic auxiliary spring $b$ constitute the springing unit. The springing is tuned by adjustment of the upper quarter-elliptic spring $b$ only so as to vary the proportion of weight that it carries relatively to the lower main spring $a$, which is not adjustable, the member $e$ being the axle casing or clip. This is effected by varying the angle which the secured end of the upper spring $b$ presents to the chassis.

The upper spring $b$ is secured to the chassis by a pivot $c$ about which it may freely turn; and a member, represented diagrammatically in Fig. 1 at $d$, which is secured to the chassis or other fixed part of the vehicle, is movable relatively thereto and forms an abutment engaged by the extreme end of the spring $b$. The abutment $d$ is represented as a cam pivoted to the chassis in Fig. 3, and in Fig. 2 as a screw working in the rigidly fixed end of the spring $a$.

In use, in order to adjust the springing of the vehicle, it is only necessary to rotate the screw or cam constituting the movable abutment $d$ with a suitable key, as so doing will alter the angle of setting of the upper spring $b$ and consequently bring it into operation to a greater or lesser extent.

The adjustment of one spring only of a combination of two lessens the harmful effects that would arise should the adjustment made be too extreme, and consequently renders the apparatus more "fool proof."

In Fig. 1 an economy of construction is effected by employing the pin $c$ on the chassis for securing both the auxiliary spring $b$ and an end of the main spring $a$.

In Fig. 1, the thin end of the auxiliary spring $b$ remains unconnected, and when brought into operation, bears against the upper face of the member $e$. With this form of construction, when the vehicle is lightly loaded, the auxiliary spring may, if desired, be adjusted so that its thin end does not come into engagement with the member $e$, but is maintained some distance above it.

In Figs. 2 and 3, the auxiliary spring $b$ is in pivotal connection with the member $e$.

What I claim and desire to secure by Letters Patent is:—

1. A spring device for vehicles comprising a main semi-elliptical spring connected to the chassis of the vehicle, a member carrying the road wheel axle secured to the mainspring, an auxiliary quarter-elliptic spring pivotally mounted at one end to the chassis and the other end engaging said mainspring, and a cam engaging the other end of said auxiliary spring to vary the tension thereon.

2. A spring device for vehicles comprising a main semi-elliptic spring having both ends connected to the chassis. a member carrying the road wheel axle disposed midway of the mainspring, an auxiliary quarter-elliptic spring pivotally mounted adjacent one end to a pin connecting an end of the mainspring to the chassis, the other end of the auxiliary spring being adapted to engage said member on the mainspring, the extremity of said pivoted end portion of the auxiliary spring extending beyond said pivot and a movable abutment on the chassis and engaging said extremity of the auxiliary spring whereby the tension on the latter may be increased or decreased.

3. A spring device for vehicles as set forth in claim 2, characterized by said abutment being a rotatable cam engaging the extremity of said auxiliary spring.

In testimony whereof, I affix my signature.

BENJAMIN HAROLD BAKER.